Oct. 6, 1970  J. D. BROCK  3,532,252
STORAGE BIN WITH FLUID AND ELECTRICAL CONTROL MEANS
Filed Aug. 2, 1968  3 Sheets-Sheet 2

INVENTOR.
James D. Brock
BY
Jones & Thomas
ATTORNEYS

Oct. 6, 1970             J. D. BROCK             3,532,252

STORAGE BIN WITH FLUID AND ELECTRICAL CONTROL MEANS

Filed Aug. 2, 1968             3 Sheets-Sheet 3

INVENTOR.
James D. Brock
BY
Jones & Thomas
ATTORNEYS

United States Patent Office 3,532,252
Patented Oct. 6, 1970

3,532,252
STORAGE BIN WITH FLUID AND ELECTRICAL CONTROL MEANS
James D. Brock, Chattanooga, Tenn., assignor, by mesne assignments, to CMI Corporation, Oklahoma City, Okla., a corporation of Oklahoma
Filed Aug. 2, 1968, Ser. No. 749,868
Int. Cl. B67d 5/08
U.S. Cl. 222—52                               20 Claims

ABSTRACT OF THE DISCLOSURE

A bin for the storage of a material such as a hot asphalt mix consisting of asphalt and various sizes of aggregate, the bin including a storage means for receiving and storing a material, a conveying means for conveying a material to a receiving opening in the storage means, a discharging means for discharging a material from the storage means through a discharge opening, a first supply means for supplying an inert or reducing fluid to the interior of the storage means at a first rate of flow, a second supply means for supplying an inert or reducing fluid to the interior of the storage means at a second rate of flow, a sealing means for sealing the storage means at the receiving opening and at the discharge opening, and a coordinating means for coordinating the operation of the conveying means, the discharging means, the first supply means, the second supply means, and the sealing means so that the sealing means is properly positioned when the conveying means or discharging means is operative, so the the first supply means supplies an inert or reducing fluid to the interior of the storage means in a manner which maintains an inert or reducing environment in the storage means, and so that the second supply means supplies an inert or reducing fluid to the interior of the storage means at a second rate of flow which prevents the collapse of the storage means by atmospheric pressure during the discharge of a material from the storage means under certain conditions.

BACKGROUND OF THE INVENTION

Field of the invention

This invention relates to a bin for storing a material such as a hot asphalt mix and more particularly to a bin in which an inert, reducing, or other fluid is used to prevent the deterioration of a material stored within the storage chamber provided by the bin.

Description of the prior art

There is a frequent requirement in the paving and other arts for a bin which may be used for the storage of a material such as a hot asphalt mix consisting of asphalt and various sizes of aggregate. With a material such as a hot asphalt mix, this requirement is most conveniently met by a bin which not only includes a storage means for receiving and storing a material but also includes a heating means for heating a material in the storage means and a supply means for supplying an inert or reducing fluid to the interior of the storage means. The heating means and supply means serve to provide a bin in which a material such as a hot asphalt mix does not readily set up, deteriorate or otherwise become unusable. Such a bin is shown in U.S. Pat. No. 3,348,739, issued on Oct. 24, 1967, to J. D. Brock for a "Hot Mix Storage Bin."

Many difficulties are encountered in the operation of a bin such as that shown in the above referenced U.S. patent. This is because the bin includes a sealing means for sealing the storage means as well as a supply means for supplying an inert or reducing fluid to the interior of the storage means and because it is difficult to coordinate the operation of a sealing means and of a supply means with each other so as to maintain an inert or reducing environment within the storage means.

It is also because it is difficult to coordinate the operation of a sealing means with the operation of a conveying means for conveying a material to the storage means or with the operation of a discharging means for discharging a material from the storage means. In addition, it is because it is difficult to coordinate the operation of a supply means with a discharging means so that a vacuum is not created within the storage means by the discharge of a material from the storage means which will cause the collapse of the storage means.

These difficulties with operating a bin such as that disclosed in the above referenced U.S. patent cause frequent damage to the bin or to a material stored within the storage means of the bin. Damage to the bin or to a material stored in the storage means of the bin is not only expensive but also causes the bin to be inoperative for an extended period of time. An attempt to avoid these difficulties with a bin such as that shown in the above referenced U.S. patent by careful operation of the bin is expensive and difficult to achieve because of the lack of trained personnel and because slow and careful operation of a bin decreases the usefulness of the bin as a ready source of a material.

In addition to the difficulties which are encountered in the operation of a prior art bin such as that shown in the above referenced U.S. patent is a further difficulty in the achieving of an effective seal with the sealing means. This is because the use of fluid pressure not only to move the sealing means relative to an opening in the storage means but also to maintain the seal causes the effectiveness of the seal to vary with fluid pressure and to be lost with the loss of fluid pressure.

SUMMARY OF THE INVENTION

The invention disclosed herein overcomes the above and other difficulties with a prior art bin such as that disclosed in the above referenced patent. This is because the invention provides a bin which is relatively easy for even an unskilled operator to operate and in which the effectiveness of the seal provided by a sealing means is not dependent upon fluid pressure.

These and other improvements in a bin are provided by a bin which includes a storage means for receiving and storing a material, a conveying means for conveying a material to a receiving opening in the storage means, a discharging means for discharging a material from the storage means through a discharge opening, a first supply means for supplying an inert or reducing fluid to the interior of the storage means at a first rate of flow, a second supply means for supplying an inert or reducing fluid to the interior of the storage means at a second rate of flow, a sealing means for sealing the storage means at the receiving opening and at the discharge opening, and a coordinating means for coordinating the operation of the conveying means, the discharging means, the first supply means, the second supply means, and the sealing means.

The coordinating means serves to insure that the sealing means is properly positioned when the conveying means or discharging means is operative, that the first supply means supplies an inert or reducing fluid to the interior of the storage means in a manner which maintains an inert or reducing environment in the storage means, and that the second supply means supplies an inert or reducing fluid to the interior of the storage means in a manner which prevents the collapse of the storage means by atmospheric pressure during the discharge of a material from the storage means under certain conditions.

Thus, it is the coordinating means in an embodiment of the invention which provides a bin which is relatively easy for even an unskilled operator to operate without causing damage to the bin or to a material stored within the storage means of the bin.

The sealing means has a door which moves relative to an opening in the storage means by fluid pressure but which is maintained in position to seal the storage means by the resilient force of a plurality of springs rather than by fluid pressure. It is because of the sealing means that the invention provides a bin in which the effectiveness of the seal provided by a sealing means is not dependent upon fluid pressure.

BRIEF DESCRIPTION OF THE DRAWING

These and other features and advantages of the invention will be more clearly understood from the following detailed description and the accompanying drawing in which like characters of reference designate corresponding parts throughout and in which.

DESCRIPTION OF AN EMBODIMENT

Figure 1:
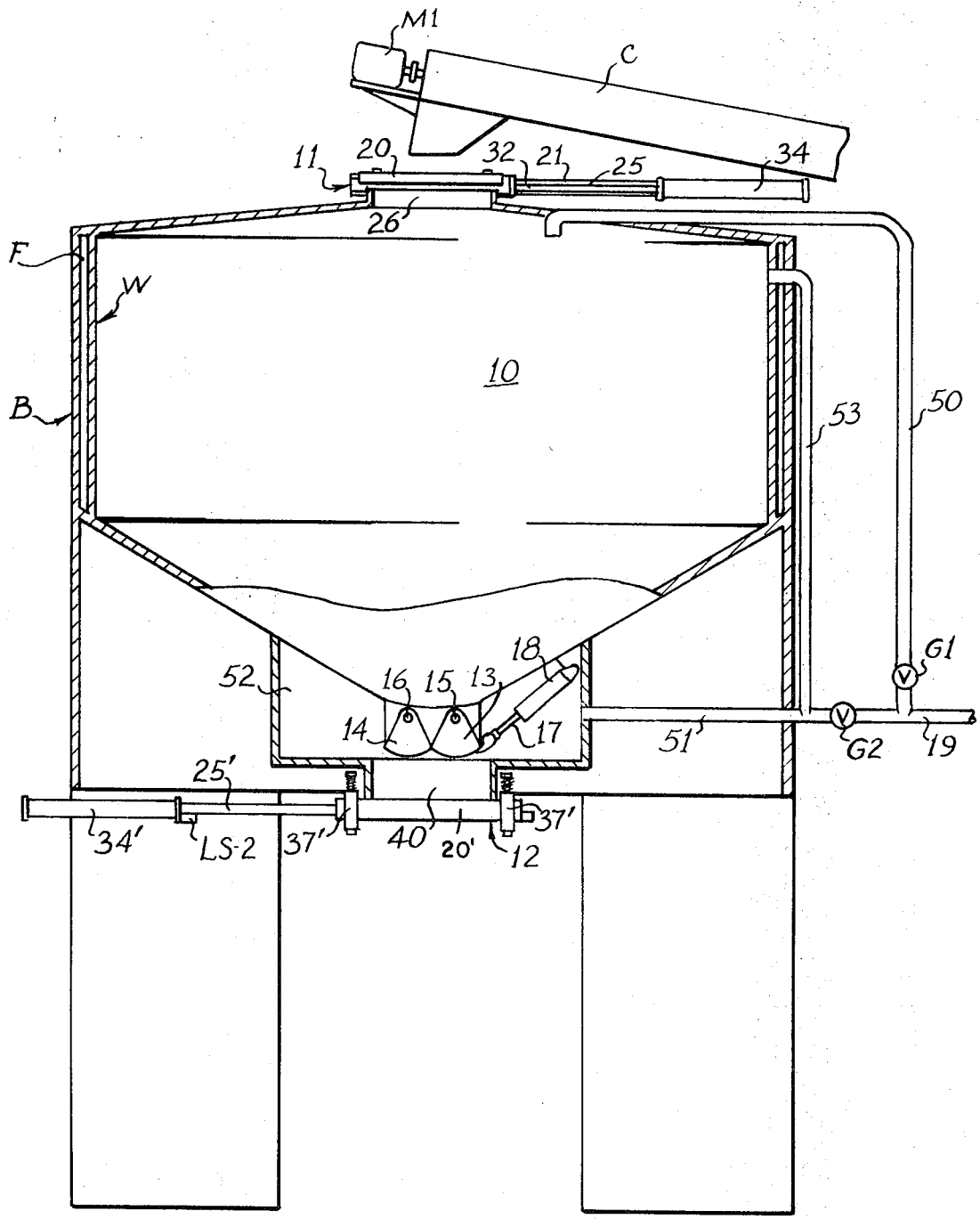
FIG. 1 is a schematic partially cross-sectional and partially elevational view of an embodiment of the invention disclosed herein.

These figures and the following detailed description disclose a specific embodiment of the invention. However, the invention is not limited to the details disclosed since it may be embodied in other equivalent forms without departing from the inventive concept.

The embodiment of the invention which is disclosed herein is an asphalt storage bin B. The bin B resembles the bin disclosed in U.S. Pat. No. 3,348,739, issued on Aug. 24, 1967, to J. D. Brock for a "Hot Mix Storage Bin" because the bin B includes a storage means such as the storage chamber 10 for receiving and storing a hot asphalt mix, a fluid chamber F within a wall W and in which a heated fluid serves as a heating means for maintaining a hot asphalt mix within the storage chamber at an elevated temperature, and a supply means for supplying an inert or reducing fluid to the interior of the storage chamber 10 so as to provide an inert or reducing environment within the storage chamber 10.

It is because the bin B resembles the bin disclosed in the above referenced patent that only certain features of the bin B will be described in detail below. These features of the bin B are a discharging means for discharging a material from the interior of the storage chamber 10, a supply means for supplying an inert or reducing fluid to the interior of the storage chamber 10, a sealing means for sealing the storage chamber 10 so as to prevent the escape of substantial amounts of an inert or reducing fluid from the interior of the storage chamber 10, and a coordinating means for coordinating the operation of the plurality of other means provided by the invention. However, even though only these feautres are described in detail below, it will be understood that the bin B includes conventional features such as the conveyor C which serves as a conveying means for conveying a hot asphalt mix from a conventional pug mill (not shown) to a receiving opening 26 in the storage chamber 10.

DISCHARGING MEANS

The discharging means in the bin B includes a pair of clam gates 13 and 14 positioned to open and close an aperture (not shown) in the bottom of the storage chamber 10 by pivotal motion about pivot points 15 and 16. The clam gates 13 and 14 are pivoted by a piston rod 17 which is extended from and retracted into a fluid cylinder 18 by fluid pressure controlled in a manner that is described below.

The extending end of the piston rod 17 is pivotally attached to the clam gate 13 and the clam gate 14 is connected to the clam gate 13 by an appropriate linkage (not shown) which serves to cause pivotal motion of the clam gate 14 in response to pivotal motion of the clam gate 13. It will be understood that, upon the moving of the clam gates 13 and 14 to open position, a hot asphalt mix stored within the storage chamber 10 will drop through the aperture (not shown) in the storage chamber 10 and into a discharge opening 40.

SUPPLY MEANS

The supply means in the bin B for supplying an inert or reducing fluid to the interior of the storage chamber 10 includes a first supply means and a second supply means. The first supply means and a second supply means both receive an inert or reducing fluid at greater than atmospheric pressure from an external source (not shown) through a feed pipe 19.

The first supply means includes the gas valve G1 which is operated by the energizing of a solenoid SOL-9 to cause the flow of an inert or reducing fluid from the feed pipe 19 through an upper pipe 50 to the upper interior of the storage chamber 10. The second supply means includes the gas valve G2 which is operated by the energizing of a solenoid SOL-10 to cause the flow of an inert or reducing fluid from the feed pipe 19 through an intermediate pipe 53 to the interior of the storage chamber 10 and through a lower pipe 51 to a sealing chamber 52 positioned around the clam gates 13 and 14 as shown in FIG. 1.

The rate of flow of an inert or reducing fluid provided by the gas valve G1 is greater than that provided by the gas valve G2. The reason for this will be understood when the coordinating means is described below. It will also be understood that an inert or reducing fluid entering the sealing chamber 52 subsequently enters the storage chamber 10 through the clam gates 13 and 14 even though the clam gates 13 and 14 are in closed position.

THE SEALING MEANS

The sealing means in the bin B includes an upper sealing means 11 and the lower sealing means 12 which are substantially identical in construction except that the vertical movement of the upper sealing means 11 is reversed from that of the lower sealing means 12. Since the lower sealing means 12 is substantially identical to the upper sealing means 11, only the upper sealing means 11 will be described in detail. However, the primes of the reference numerals applied to the upper sealing means 11 are applied to corresponding parts of the lower sealing means 12 in the drawing.

Figure 2:
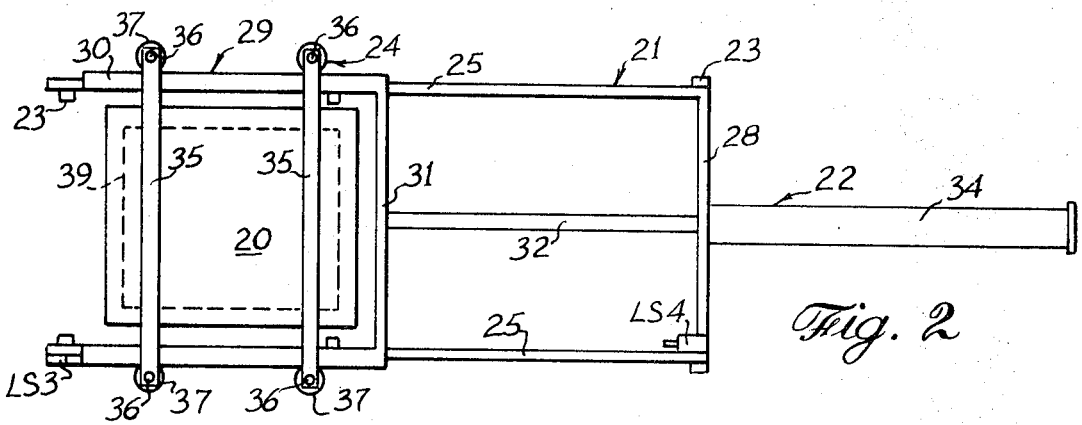
FIG. 2 is an enlarged top plan view of the upper sealing means in that embodiment of the invention shown in FIG. 1.
Figure 3:
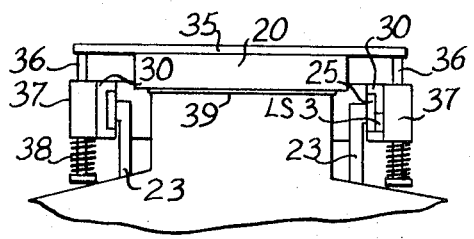
FIG. 3 is an end elevational view of the upper sealing means in that embodiment of the invention shown in FIG. 1.

Referring more particularly to FIG. 2 and FIG. 3, it will be seen that the upper sealing means 11 comprises generally a door 20 and a door control assembly 21. The door 20 is movable both horizontally and vertically and the door control assembly 21 includes a horizontal positioning sub-assembly 22 and a vertical positioning sub-assembly 24.

The horizontal positioning sub-assembly 22 includes a pair of parallel, spaced guide members 25 attached to the storage chamber 10 at each side of the receiving opening 26 by a mounting member 23. The guide members 25 are connected by a cross brace 28 and door support frame 29 is slideably carried on the guide members 25. The door support frame 29 includes a pair of spaced 40 and includes a manually operable pushbutton PB2 in parallel with normally open contacts L7–1 and in series with normally closed contacts L2–3, a relay coil L7, and normally closed relay contacts L6–2. In parallel with the relay coil L7 are the solenoid SOL–1 for operating the control valve V7 and the solenoid SOL–3 for operating the control valve V5.

The door operating circuit H is for moving the door 20 to its closed position relative to the receiving opening 20 and includes a manually operable pushbutton PB3 in parallel with normally open contacts L8–1 and a relay coil L9 and in series with normally closed relay contacts L10–2, normally closed relay contacts L3–1, and a relay coil L–8. In addition, the door operating circuit H includes across the voltage V1 normally open relay contacts L9–1 in series with the solenoid SOL–5 for operating the control valve V4 and the solenoid SOL–6 for operating the control valve V2.

The door operating circuit J is for moving the door 20 to its open position relative to the receiving opening 26 and includes a manually operable pushbutton PB–4 in parallel with normally open relay contacts L10–1 and in series with normally closed relay contacts L5–3 and normally closed relay contacts L8–3. The relay coil L–10 is in parallel with the solenoid SOL–4 for operating the control valve V4 and the solenoid SOL–6 for operating the control valve V2.

In addition to the door operating circuits E, F, H, and J, the coordinating means includes a gas control circuit K across the voltage V1. The gas control circuit K includes normally open relay contacts L3–2 in parallel with the normally open relay contacts L8–2 and in series with the solenoid SOL–10 which when energized open the gas valve G2.

The coordinating means also includes the material control circuits L, M, and N and P, in parallel across the voltage V1. The material control circuit L is for opening the clam gates 13 and 14 and includes a manually operable pushbutton PB–5 in series with normally open relay contacts L2–1, normally closed relay contacts L15–2, a relay coil L13, and the solenoid SOL–8 for opening the clam gates 13 and 14. In addition, the material control circuit L includes normally open relay contacts L13–1 and normally open relay contacts L14–1 in parallel and in series with normally open relay contacts L2–2, the solenoid SOL–9 which operates the gas pressure valve G1, normally closed relay contacts L15–1, a relay coil L14, and normally open relay contacts L4–1.

The material control circuit M is for closing the clam gates 13 and 14 and includes a manually operable pushbutton PB–6 in series with normally closed relay contacts L13–2, a relay coil L15, and the solenoid SOL–7 for closing the clam gates 13 and 14. The conveyor control circuit N is for controlling the opreation of the motor M1 of the conveyor C and includes a two position switch S2 in series with normally open relay contacts L5–2 and a relay coil L11. The conveyor control circuit P is for controlling the operation of the motor M2 of a pug mill conveyor (not shown) and includes a two position switch S3 in series with normally open relay contacts L11–2, a relay coil L12, and normally open relay contacts L5–1.

OPERATION

From the foregoing description, it will now be understood that there are fifteen relays in the electrically operated portion of the coordinating means which correspond to the relay coils L1, L2, L3, L4, L5, L6, L7, L8, L9, L10, L11, L12, L13, L14, and L15 respectively. The relay having the relay coil L1 in the limit switch circuit A is energized when the door 20' is in closed positon to cause the relay contacts L1–1 to open in the door operating circuit E. The opening of the relay contacts L1–1 in the door operating circuit E prevents the depressing of the pushbutton PB1 from energizing the relay coil L6 and as will be understood from a description of the operation of door operating circuit E below, prevents the energizing of the solenoid SOL–2 to move the door 20' to closed position when the door 20' is already in closed position.

The relay having the relay coil L2 in the limit switch circuit B is energized when the door 20' is in open position. The energizing of the relay coil L2 closes the normally open contacts L2–1 and the normally open contacts L2–2 in the material control circuit L and opens the normally closed contacts L2–3 in the door operating circuit F. The closing of the normally open relay contacts L2–1 renders the clam gates 13 and 14 operable by the depressing of the manually operable pushbutton PB–5 and insures that the clam gates 13 and 14 can be opened to allow the discharge of an asphalt mix only when the door 20' is in its open position. The opening of the relay contacts L2–3 in the door operating circuit F prevents the energizing of the solenoid SOL–1 and the opening of the door 20' when the door 20' is already in open position. The closing of the normally open relay contacts L2–2 provides one of several conditions necessary for operating the gas valve G1 as described below.

The relay having the relay coil L3 in the limit switch circuit C is energized when the door 20 is in closed position and causes the normally closed relay contacts L3–1 in the door operating circuit H to open and the normally open relay contacts L3–2 in the gas control circuit K to close. The opening of the normally closed relay contacts L3–1 prevents the energizing of the relay coil L8 and as will be described below, prevents the energizing of the solenoid SOL–5 to move the door 20 to its closed position when the door 20 is already in its closed position. The closing of the relay contact L3–2 in the gas control circuit K causes the energizing of the solenoid SOL–10 and the opening of the gas valve G2. Thus, whenever the door 20 is in its closed position the gas valve G2 is operated to provide an atmosphere of inert or reducing fluid within the storage chamber 10.

The relay having the relay coil L4 in the limit switch circuit C is energized when the door 20 is in its closed position and causes the normally open relay contacts L4–1 in material control circuit L to close. The relay contacts L4–1 are in series with the normally open relay contacts L2–2, the normally closed relay contacts L15–1, the normally open relay contacts L14–1, and the solenoid SOL–9 by which the gas valve G1 is operated. As indicated above, the relay contacts L2–2 are closed when the door 20' is in its open position and as indicated below, the relay contacts L14–1 are closed when the clam gates 13 and 14 are open. Thus, the solenoid SOL–9 is energized when the door 20' is in its open position, the door 20 is in its closed position, and the clam gates 13 and 14 are open. As a result a large volume of inert or reducing fluid is fed into the storage chamber 10 when the clam gates 13 and 14 are open and the door 20 is closed. This prevents the forming of a vacuum within the storage chamber 10 and the possible collapse of the storage chamber 10 as the result of the discharge of a material from the storage chamber 10.

The relay having the relay coil L5 in the limit switch circuit D is energized when the door 20 is in open positon and causes the normally open contacts L5–1 in the material control circuit P to close, the normally open contacts L5–2 in the material control circuit N to close, and the normally closed contacts L5–3 in the door operating circuit J to open. The closing of the normally open contacts L5–1 in the material control circuit P closes one of a series of relay contacts which must be closed in order for the closing of the switch S3 to cause the operation of the motor M2 of a pug mill conveyor (not shown) and insures that the motor M2 of a pug mill conveyor cannot be operated unless the door 20 is in its open position.

Similarly, the closing of the relay contacts L5–2 only when the door 20 is in its open position prevents the channels 30 which are slideably mounted on the guide members 25 and which are connected by a driving brace 31. The driving brace 31 is connected at approximately its center to a piston rod 32 extending from a fluid cylinder 34. The fluid cylinder 34 is fixedly connected to the cross brace 28 and when the piston rod 32 is extended and retracted by fluid pressure within the fluid cylinder 34, the door support frame 29 is selectively positioned along the guide members 25.

The vertical positioning sub-assembly 24 includes a pair of support braces 35 which are attached to the upper surface of the door 20 and extend transversely of the door support frame 29. Each of the extending ends of the support braces 35 is attached to a rod 36 extending from a vertically disposed fluid cylinder 37 mounted on a channel 30. It will be seen in FIG. 2 that there are four such rods 36 which support the support braces 35 and the door 20 relative to the channels 30.

Each rod 36 extends through a fluid cylinder 37 and a compression type spring 38 is placed between the end of a rod 36 and the end of a fluid cylinder 37 so that when fluid pressure is not extending a rod 36 from a fluid cylinder 37, the spring 38 causes a rod 36 to be retracted into a fluid cylinder 37. As seen in FIG. 3, when the piston rods 36 are retracted by the springs 38, the door 20 is urged downwardly and into sealing engagement about the receiving opening 26.

To insure complete sealing of the receiving opening 26, a conventional gasket 39 is provided in the bottom surface of the door 20. It will be understood that when the fluid cylinders 37 extend the rods 36 upwardly against the springs 38, the door 20 is raised from around the receiving opening 26 and the seal formed between the door 20 and the receiving opening 26 is broken. It is when the door 20 is raised that the fluid cylinder 34 is activated to move the door 20 and its support frame 29 away from or toward the receiving opening 26.

FLUID OPERATED PORTION OF THE COORDINATING MEANS

Figure 4:
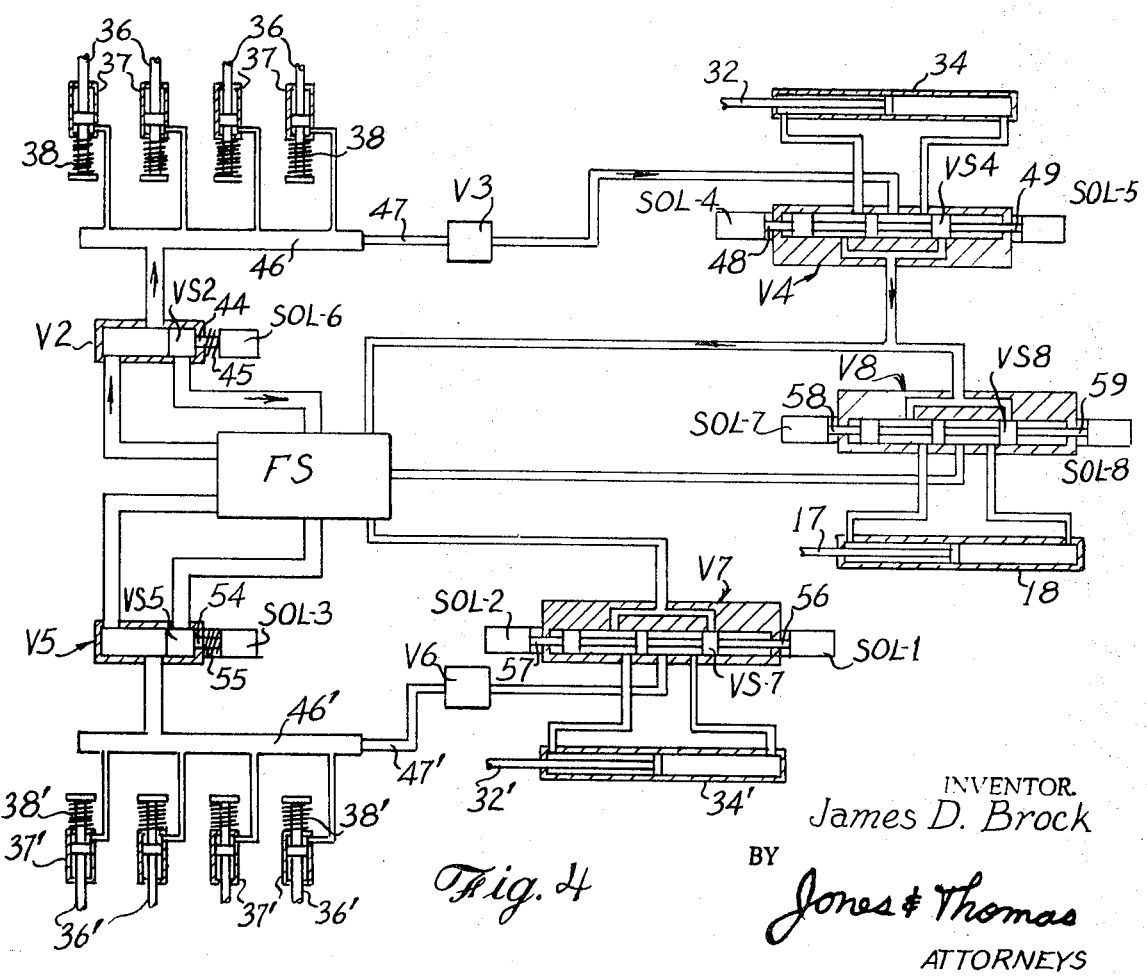
FIG. 4 is a schematic presentation showing the fluid operated portion of the coordinating means in that embodiment of the invention shown in FIG. 1.

The fluid operated portion of the coordinating means provides a means for selectively applying pneumatic or hydraulic pressure to the fluid cylinders 34, 34′, 37 and 37′. Referring to FIG. 4, it will be seen that this portion of the coordinating means includes a fluid supply FS of conventional design which supplies fluid under pressure to a control valve V2. The control valve V2 is a two-way valve of conventional design having a spool VS2 connected to the movable core 44 of a solenoid SOL–6. It will be seen from FIG. 4 that the pressure outlet of the control valve V2 is connected to a manifold 46 and that a spring 45 urges the core 44 toward extended position so that no fluid under pressure is supplied to the manifold 46 unless the solenoid SOL–6 is energized to open the valve V2 by retracting the core 44.

The manifold 46 connects the fluid cylinders 37 in parallel with each other and with the branch 47. The branch 47 includes a time delay valve V3 and a control valve V4 which controls the operation of the fluid cylinder 34. The time delay valve V3 is of conventional design and serves to prevent sliding movement of the door support frame 29 until the door 20 is released from sealing engagement about the receiving opening 26 by fluid pressure in the fluid cylinders 37.

The control valve V4 is a conventional four-way control valve having a movable spool VS4 connected to both the movable core 48 of a solenoid SOL–4 and the movable core 49 of a solenoid SOL–5. When the solenoids SOL–4 and SOL–6 are both activated, the spool VS4 is positioned so that the piston 32 is retracted to move the door 20 and open the receiving opening 26 and when the solenoids SOL–5 and SOL–6 are both activated, the piston 32 is extended to move the door 20 and close the receiving opening 26. After the door 20 is in open or closed position, the de-energizing of the solenoid SOL–6 releases the door 20 and the springs 38 lock the door 20 in position.

The door 20′ in the lower sealing means 12 is also moved by fluid pressure from the fluid supply FS. As shown in FIG. 4, the fluid supply FS is connected to a control valve V5 having its spool VS5 connected to a solenoid SOL–3 which has its core 54 urged toward extended position by a spring 55. The pressure outlet of the control valve V5 is connected to a manifold 46′ to which the fluid cylinders 37′ and a branch 47′ are connected. The branch 47′ includes a time delay valve V6 and a control valve V7. The control valve V7 has a spool VS7 connected to both the core 56 of a solenoid SOL–1 and to the core 57 of solenoid SOL–2. The control valves V5 and V7 and the time delay valve V6 serve to position the door 20′ relative to the discharge opening 40 in the same manner as the control valves V2 and V4 and the time delay valve V3 serve to position the door 20 relative to the receiving opening 26.

The clam gates 13 and 14 are aso opened and closed by fluid pressure from the fluid supply FS. From FIG. 4 it will be seen that the operation of the fluid cylinder 18 is controlled by a control valve V8 to which a fluid under pressure is supplied from the fluid supply FS. The control valve V8 has a spool VS8 connected to both the core 58 of a solenoid SOL–7 and to the core 59 of a solenoid SOL–8. The energizing of the solenoid SOL–8 causes the piston rod 17 to be retracted into the fluid cylinder 18 and the clam gates 13 and 14 to open. Similarly, the energizing of the solenoid SOL–7 causes the piston rod 17 to be extended from the fluid cylinder 18 and the clam gates 13 and 14 to close.

ELECTRICAL OPERATED PORTION OF THE COORDINATING MEANS

The electrical operated portion of the coordinating means provides a means for selectively energizing solenoids such as the solenoid SOL–1 shown in FIG. 4 and for otherwise selectively operating components of the invention.

Figure 5:
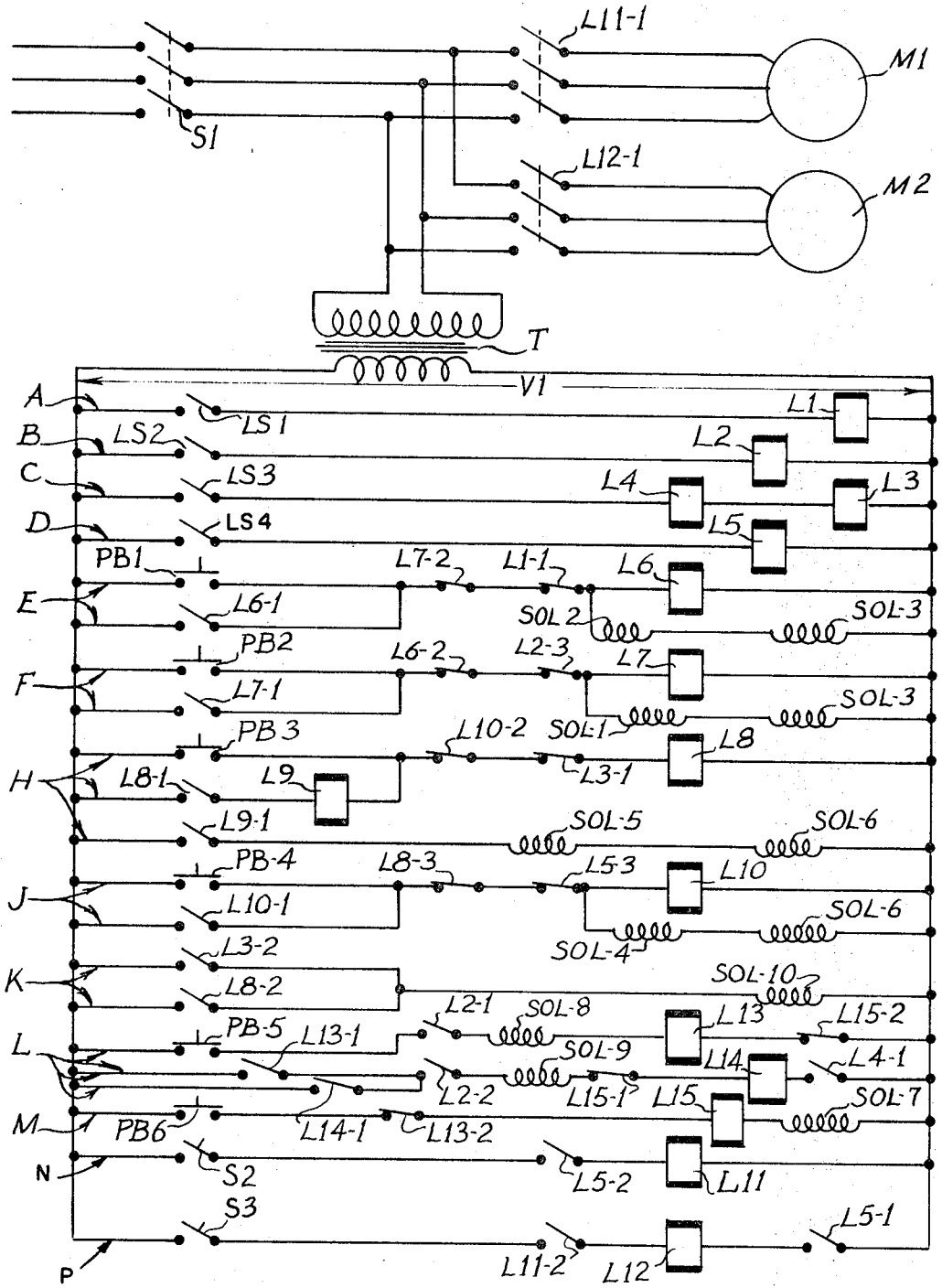
FIG. 5 is a schematic presentation showing the electrically operated portion of the coordinating means in that embodiment of the invention shown in FIG. 1.

When FIG. 5 is examined, it will be seen that a line switch S1 is in series with relay contacts L11–1 by which the motor M1 of the conveyor C is energized and with relay contacts L12–1 by which the motor M2 of a pug mill conveyor (not shown) is energized. The line switch S1 also serves to energize the primary of a single phase transformer T from the secondary of which a control voltage V1 is provided.

In parallel across the voltage V1 are four limit switch circuits A, B, C and D. Limit switch circuit A includes a relay coil L1 in series with a limit switch LS1 which is closed when the door 20′ is in closed position relative to the discharge opening 40 and limit switch circuit B includes a relay coil L2 in series with a limit switch LS2 which is closed when the door 20′ is in open position. Similarly, limit switch circuit C includes a relay coil L3 and a relay coil L4 in series with a limit switch LS3 which is closed when the door 20 is in closed position relative to the receiving opening 26 and limit switch circuit D includes the relay coil L5 in series with a limit switch LS4 which is closed when the door 20 is in open position.

In parallel with the limit switch circuits A, B, C and D across the voltage V1 are a plurality of door operating circuits E, F, H, and J. The door operating circuit E is for moving the door 20′ into closed position relative to the discharge opening 40 and includes a manually operable push button PB1 in parallel with the normally open relay contacts L6–1 and in series with normally closed relay contacts L1–1, normally closed relay contacts L7–2, and a relay coil L6. The relay coil L6 is in parallel with the solenoid SOL–2 for operating the control valve V7 and the solenoid SOL–3 for operating the control valve V5.

The door operating circuit F is for moving the door 20′ into open position relative to the discharge opening operation of the motor M1 of the conveyor C when the door 20 is not in its open position. The opening of the relay contacts L5-3 prevents the energizing of a solenoid SOL-4 so that the depressing of the manually operable pushbutton PB-4 will not energize the solenoid SOL-4 to move the door 20 to its open position when the door 20 is already in its open position.

The relay having the relay coil L6 in the door operating circuit E closes the normally open contacts L6-1 in the door operating circuit E and opens the normally closed contacts L6-2 in the door operating circuit F when the pushbutton PB-1 is closed. The closing of the relay contacts L6-1 in the door operating circuit E provides a holding circuit for the relay coil L-6 and the solenoid SOL-2 so that it is only necessary to momentarily close the manually operable pushbutton PB-1 for the solenoid SOL-2 to remain energized and cause the moving of the door 20' to its closed position until the relay contacts L1-1 are opened by the closing of the limit switch LS-1 in the limit switch circuit A. The opening of the relay contacts L6-2 prevents inadvertent operating of the door operating circuit F while the door 20' is being moved to closed position.

The relay having the relay coil L7 in the door operating circuit F is energized by the depressing of the manually operable pushbutton PB-2 and causes the closing of the normally open contacts L7-1 and the opening of the normally closed relay contacts L7-2. The closing of the relay contacts L7-1 provides a holding circuit for the relay coil L7 and the solenoid SOL-1 so that even though the pushbutton PB-2 is only momentarily depressed, the solenoid SOL-1 remains energized to cause the moving of the door 20' toward open position until the relay contacts L2-3 are opened by the energizing of the relay coil L2 in the limit switch circuit B by the door 20' being placed in open position. The opening of the relay contacts L7-2 prevents the inadvertent operating of the door operating circuit E while the door 20' is being moved to open position.

The relay having the relay coil L8 in the door operating circuit H is energized by the momentary closing of the manually operable pushbutton PB-3 and when energized closes the normally open contacts L8-1 in the door operating circuit H, closes the normally open contacts L8-2 in the gas control circuit K, and opens the normally closed contacts L8-3 in the door operating circuit J. The opening of the relay contacts L8-3 in the door operating circuit J prevents the inadvertent operating of the door operating circuit J while the door 20 is being moved to closed position.

The closing of the normally open relay contacts L8-1 energizes the relay coil L9 and in addition provides a holding circuit for the relay coil L8 so that the relay coil L8 remains energized until the relay coil L3 is energized by the door 20 being placed in closed position even though the pushbutton PB-3 is only momentarily depressed. The energizing of the relay coil L9 in the door operating circuit H closes the normally open relay contacts L9-1 in the door operating circuit H and the closing of the relay contacts L9-1 causes the solenoids SOL-5 to be energized.

The relay coil L9 and the relay contacts L9-1 are of a conventional time delay relay and serve to cause the solenoid SOL-5 to be energized subsequent to the closing of the relay contacts L8-2 which causes the operation of the gas valve G2. Thus, upon the depressing of the pushbutton PB-3, an inert or reducing fluid initially flows into the storage chamber 10 and subsequently the door 20 moves toward its closed position until the relay coil L3 is energized to open the normally closed relay contacts L3-1. It is by this arrangement that a purging inert or reducing fluid is introduced into the storage chamber 10 prior to the door 20 starting to close and during the closing of the door 20.

The relay having the relay coil L10 in the door operating circuit J is energized by the momenetary depressing of the normally operable pushbutton PB4 and serves to close the normally open contacts L10-1 and to open the normally closed relay contacts L10-2. The closing of the normally open contacts L10-1 provides a holding circuit for the relay coil L10 and the solenoid SOL-4 which remain energized even through the pushbutton PB-4 is no longer depressed until the relay coil L5 in the limit switch circuit D is energized by the door 20 being placed in its open position. The opening of the normally closed relay contacts L10-2 prevents the inadvertent operating of the door operating circuit F while the door 20 is being moved to its open position.

The relay having the relay coil L11 in the material control circuit N is energized by placing the two position switch S2 in its closed position when the relay coil L5 is energized to close the relay contacts L5-2 because the door 20 is in its open position. The relay coil L11 serves to close the normally open contacts L11-1 and to operate the motor M1 of the conveyor C as long as the switch S2 is in its closed position.

The relay having the relay coil L12 in the material control circuit P is energized by placing the two position switch S3 in its closed position when the relay contacts L5-1 are closed because the door 20 is in its open position and when the relay contacts L11-2 are closed because the motor M1 of the conveyor C is operating. The energizing of the relay coil L12 closes the normally open contacts L12-1 and causes the operation of the motor M2 of a pug mill conveyor (not shown). Thus, the motor M2 of a pug mill conveyor cannot be operated unless the door 20 is open and the conveyor C is operating.

The relay having the relay coil L13 in the material control circuit L is energized with the solenoid SOL-8 when, and as long as, the manually operable pushbutton PB-5 is depressed if the normally open relay contacts L2-2 are closed because the door 20' is open. The energizing of the solenoid SOL-8 causes the clam gates 13 and 14 to open and the energizing of the relay coil L13 closes the normally open relay contacts L13-1 and opens the normally closed relay contacts L13-2 in the material control circuit M. The opening of the relay contacts L13-2 prevents the inadvertent operation of the material control circuit M to close the clam gates 13 and 14 while the clam gates 13 and 14 are being opened.

The relay having the relay coil L14 in the material control circuit L is energized with the solenoid SOL-9 when the relay contacts L13-1 are closed by the energizing of the relay coil L13 if the normally open relay contacts L2-2 are closed because the door 20 is in closed position. The energizing of the solenoid SOL-9 operates the gas valve G1 and the energizing of the relay coil L14 closes the normally open relay contacts L14-1 to provide a holding circuit for the solenoid SOL-9 when the relay contacts L13-1 open because the pushbutton PB-5 is no longer depressed.

It will be understood that the clam gates 13 and 14 continue to open only as long as the pushbutton PB-5 is depressed so that the extent to which the clam gates 13 and 14 are opened may be varied. However, the gas valve G1 remains operated even after the pushbutton PB-5 is no longer depressed so as to provide an inert or reducing fluid to the interior of the storage chamber 10 as long as the clam gates 13 and 14 and the door 20' are open and the door 20 is closed. This insures a continuous flow of an inert or reducing fluid into the storage chamber 10 to prevent the collapse of the storage chamber 10 by atmospheric pressure as a material is discharged from the storage chamber 10.

The relay having the relay coil L15 in the material control circuit M is energized with the solenoid SOL-7 when and as long as the manually operable pushbutton PB-6 is depressed. The energizing of the solenoid SOL-7 closes the clam gates 13 and 14 and the energizing of the relay coil L5 opens the normally closed relay contacts L15-1 and the normally closed contacts L15–2 in the material control circuit L.

The opening of the relay contacts L15–1 de-energizes the solenoid SOL–9 to stop the flow of an inert or reducing fluid through the valve G1 as the clam gates 13 and 14 close. The opening of the relay contacts L15–2 prevents the inadvertent operation of the material control circuit L to open the clam gates 13 and 14 while the clam gates 13 and 14 are closing.

From the foregoing description of the operation of the invention in terms of relays such as the relay having the relay coil L1, it will now be understood that the invention provides a first supply means for supplying an inert or reducing fluid to the interior of the storage chamber 10 at a relatively low rate of flow and a second supply means for supplying an inert or reducing fluid to the interior of the storage chamber 10 at a relatively high rate of flow. The first supply means is responsive to the door 20 being in closed position and after a time delay, to the energizing of the door operating circuit H to move the door 20 from open position to closed position. The time delay is sufficient to allow for the purging of ambient air from the storage chamber 10 by an inert or reducing fluid. The second supply means is responsive to the opening of the clam gates 13 and 14 when the door 20 is closed and the door 20' is open and serves to prevent a vacuum being created within the storage chamber 10 by a material being discharged through the clam gates 13 and 14 and the discharge opening 40.

In addition, it will now be understood that the door operating circuits H and J provide a control means for opening and closing the receiving opening 26 in which the closing of the receiving opening 26 is prevented when the door 20 is in closed position or is being moved to open position and in which the opening of the receiving opening 26 is prevented when the door 20 is in open position or is being moved to closed position. Similarly, the door control circuits E and F provide a control means for opening and closing the discharge opening 40 in which the opening of the discharge opening 40 is prevented when the door 20' is open or is being moved to closed position and in which the closing of the discharge opening 40 is prevented when the door 20' is in closed position or is being moved to open position.

Moreover, it will be understood that the coordinating means provides a first disabling means which prevents the operation of the motor M2 of a pug mill conveyor (not shown) if the door 20 is not in open position and if the conveyor C is not operating. A second disabling means is also provided for preventing the operation of the conveyor C if the door 20 is not in open position. The first disabling means and the second disabling means insure that a material such as a hot asphalt mix is not conveyed to the storage chamber 10 when the receiving opening 26 is not open.

It is because of the coordinating means and the other features of the invention that the invention provides a bin B in which an environment of inert or reducing fluid may be maintained in the storage chamber 10 without making it difficult to deliver a material to the storage chamber 10 or discharge a material from the storage chamber 10. Furthermore, the invention provides a bin B which may be substantially sealed with other than fluid pressure to prevent the escape of a fluid from the storage chamber 10, in which ambient air is purged from the storage chamber 10 immediately prior to and during the closing of the receiving opening 26 by the door 20, and in which the forming of a vacuum within the storage chamber 10 that would collapse the storage chamber 10 or hinder the discharge of a material is prevented.

It will be obvious to those skilled in the art that many variations may be made in the embodiments chosen for the purpose of illustrating the present invention.

I claim:

1. In a bin for storing a material in a storage means, an upper means for selectively opening and closing a receiving opening in said storage means, and a conveying means operative for conveying a material to said receiving opening, said conveying means being responsive to said upper means so that said conveying means is inoperative when said receiving opening is closed.

2. The bin of claim 1 including a lower means for selectively opening and closing a discharge opening in said storage means.

3. The bin of claim 2 including a discharging means for discharging a material from said storage means through said discharge opening, said discharging means being operatively responsive to said lower means so that a material is discharged by said discharging means only when said discharge opening is open.

4. The bin of claim 3 including a supply means responsive to said upper means, said lower means, and said discharging means for supplying a fluid to said storage means when said receiving opening, is closed, said discharge opening is open, and said discharge means is operative.

5. The bin of claim 1 in which said conveying means conveys a material from a conveyor of a pug mill operated by a motor and in which said motor is responsive to said conveying means and said upper means so that said motor is inoperative when said conveying means is inoperative and said receiving opening is closed.

6. The bin of claim 1 in which said conveying means is a first conveying means and including a second conveying means operative for conveying said material to said first conveying means, said second conveying means being responsive to said first conveying means so that said second conveying means is inoperative when said first conveying means is inoperative.

7. In a bin for storing a material in a storage means, a lower means for selectively opening and closing a discharge opening in said storage means, and a discharging means for discharging a material from said storage means to said discharge opening, said discharging means including a gate positioned to control the flow of said material and being operatively responsive to said lower means so that a material is discharged by said discharging means only when said discharge opening is open.

8. In a bin for storing a material in a storage means, a lower means for selectively opening and closing a discharge opening in said storage means, and a discharging means for discharging a material from said storage means to said discharge opening, said discharging means being spaced from said lower means and being operatively responsive to said lower means so that a material is discharged by said discharging means only when said discharge opening is open.

9. In a bin for storing a material in a storage means within the interior of which an environment is provided by a fluid, an upper sealing means for selectively opening and closing a receiving opening in said storage means, and a supply means for supplying a fluid to said interior of said storage means, said upper sealing means including a door having an open position relative to said receiving opening and a closed position relative to said receiving opening and said supply means being operatively responsive to the closed position of said door.

10. The bin of claim 9 including a door operating means for causing said door to move from said open position to said closed position following a time delay during which said supply means is operative.

11. The bin of claim 10 in which said supply means is operative as said door moves from said open position to said closed position.

12. In a bin for storing a material in a storage means within the interior of which an environment is provided by a fluid; an upper sealing means for selectively opening and closing a receiving opening in said storage opening said upper sealing means including a door, a first positioning means for moving said door laterally relative to said receiving opening, and a second positioning means for moving said door vertically relative to said receiving opening; and a supply means for supplying a fluid to said interior of said storage means.

13. In a bin for storing a material in a storage means within the interior of which an environment is provided by a fluid; an upper sealing means for selectively opening and closing a receiving opening in said storage means, said upper sealing means including a door and a positioning means for positioning said door relative to said receiving opening by a resilient force and by a fluid force opposing said resilient force; and a supply means for supplying a fluid to said interior of said storage means.

14. In a bin for storing a material in a storage means within the interior of which an environment is provided by a fluid, an upper sealing means for selectively opening and closing a receiving opening in said storage means, a supply means for supplying a fluid to said interior of said storage means, and a discharging means for discharging a material from said storage means, said discharging means being enclosed within a sealing chamber.

15. The bin of claim 13 in which said resilient force urges said door into sealing engagement with said storage means around said receiving opening and in which said fluid force moves said door away from said storage means.

16. The bin of claim 14 including a lower sealing means for selectively opening and closing a discharge opening in said sealing chamber.

17. The bin of claim 14 in which said discharging means includes a plurality of clam gates.

18. The bin of claim 12 in which said second positioning means includes a plurality of resilient members for urging said door into sealing engagment with said storage means around said receiving opening with a resilient force, and a fluid operated means operative to move said door away from said storage means against said resilient force.

19. The bin of claim 18 in which said fluid operated means is a first fluid operated means and in which said first positioning means includes a second fluid operated means for moving said door laterally after said first fluid operated means is operative.

20. The bin of claim 19 including limiting means responsive to a position of said door for making said second fluid operated means inoperative.

References Cited

UNITED STATES PATENTS 3,319,834    5/1967    Steele      222—482 X
3,348,739    10/1967    Brock      222—146

STANLEY H. TOLLBERG, Primary Examiner

U.S. Cl. X.R.

222—482